United States Patent
Woo et al.

(10) Patent No.: US 10,209,513 B2
(45) Date of Patent: Feb. 19, 2019

(54) WEARABLE DEVICE AND CONTROL METHOD THEREOF

(71) Applicant: SAMSUNG ELECTRONICS CO., LTD., Suwon-si (KR)

(72) Inventors: Ji-Hwan Woo, Seoul (KR); Won-hee Choe, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 149 days.

(21) Appl. No.: 14/730,769

(22) Filed: Jun. 4, 2015

(65) Prior Publication Data
US 2016/0127624 A1  May 5, 2016

(30) Foreign Application Priority Data

Nov. 3, 2014  (KR) .................. 10-2014-0151288

(51) Int. Cl.
| | | |
|---|---|---|
| G02B 27/01 | (2006.01) | |
| G06F 3/0484 | (2013.01) | |
| G06F 1/16 | (2006.01) | |
| G06F 3/01 | (2006.01) | |
| G06F 3/03 | (2006.01) | |
| H04N 5/232 | (2006.01) | |
| H04N 9/31 | (2006.01) | |

(52) U.S. Cl.
CPC ....... *G02B 27/017* (2013.01); *G02B 27/0179* (2013.01); *G06F 1/163* (2013.01); *G06F 3/011* (2013.01); *G06F 3/017* (2013.01); *G06F 3/0304* (2013.01); *G06F 3/0484* (2013.01); *H04N 5/23216* (2013.01); *H04N 5/23293* (2013.01); *H04N 9/3173* (2013.01); *H04N 9/3179* (2013.01); *H04N 9/3194* (2013.01)

(58) Field of Classification Search
None
See application file for complete search history.

(56) References Cited

U.S. PATENT DOCUMENTS

| | | | |
|---|---|---|---|
| 9,785,247 B1* | 10/2017 | Horowitz | ................ G06F 3/017 |
| 9,846,529 B2* | 12/2017 | Brehmer | ............... G06F 3/0488 |
| 2011/0267316 A1* | 11/2011 | Kim | ....................... G06F 1/1639 |
| | | | 345/175 |

(Continued)

FOREIGN PATENT DOCUMENTS

| | | |
|---|---|---|
| JP | 2014-067388 A | 4/2014 |
| KR | 10-2014-0069660 A | 6/2014 |

OTHER PUBLICATIONS

Communication dated Jul. 19, 2018, issued by the Korean Intellectual Property Office in counterpart Korean Application No. 10-2014-0151288.

*Primary Examiner* — Chikaodili E Anyikire
(74) *Attorney, Agent, or Firm* — Sughrue Mion, PLLC

(57) ABSTRACT

A wearable device that is configured to be worn on a body of a user and a control method thereof are provided. The wearable device includes an image projector configured to project a virtual user interface (UI) screen, a camera configured to capture an image, and a processor configured to detect a target area from the image captured by the camera, control the image projector to project the virtual UI screen, which corresponds to at least one of a shape and a size of the target area, onto the target area, and perform a function corresponding to a user interaction that is input through the virtual UI screen.

23 Claims, 19 Drawing Sheets

(56) References Cited

U.S. PATENT DOCUMENTS

| | | | |
|---|---|---|---|
| 2012/0075168 A1* | 3/2012 | Osterhout | G02B 27/017 |
| | | | 345/8 |
| 2013/0257748 A1* | 10/2013 | Ambrus | G02B 27/0093 |
| | | | 345/173 |
| 2014/0055352 A1* | 2/2014 | Davis | G06F 3/017 |
| | | | 345/156 |
| 2014/0068476 A1 | 3/2014 | Kosaki | |
| 2014/0104164 A1 | 4/2014 | Chen | |
| 2014/0149950 A1 | 5/2014 | Mun et al. | |
| 2015/0016777 A1* | 1/2015 | Abovitz | G02B 27/225 |
| | | | 385/37 |
| 2015/0073907 A1* | 3/2015 | Purves | G06Q 20/32 |
| | | | 705/14.58 |
| 2015/0193000 A1* | 7/2015 | Hu | G06F 3/017 |
| | | | 345/156 |
| 2015/0309535 A1* | 10/2015 | Connor | G06F 1/163 |
| | | | 361/679.03 |
| 2015/0332075 A1* | 11/2015 | Burch | G06K 7/10821 |
| | | | 345/156 |

* cited by examiner

WEARABLE DEVICE AND CONTROL METHOD THEREOF

CROSS-REFERENCE TO RELATED APPLICATION(S)

This application claims priority from Korean Patent Application No. 10-2014-0151288, filed on Nov. 3, 2014 in the Korean Intellectual Property Office, the disclosure of which is incorporated herein by reference in its entirety.

BACKGROUND

1. Field

Apparatuses and methods consistent with exemplary embodiments relate to a wearable device and a control method thereof, and more particularly, to a wearable device that includes a projector and a control method thereof.

2. Description of the Related Art

Recent development of electronic technologies has brought about a vast development of various types of display apparatuses. For example, display apparatuses such as a television (TV), a personal computer (PC), a laptop computer, a tablet PC, a portable phone, an MP3 player, etc., are commonly used in most homes.

In order to meet demands of users who want newer and more advanced functions, efforts have been undertaken to develop newer forms of display apparatuses. One example of a relatively new display apparatus is a wearable display device. The wearable display device refers to a device that may be formed of a flexible material such as a silicon rubber and is capable of being worn by or put on a user.

An example of a wearable display apparatus is a watch. For example, a user may wear a wearable device such as a watch on a body or wrist of the user. However, a wearable device typically has a smaller display screen than display screens of other terminal devices. Thus, accurately receiving touch input through a display screen or touch panel of a wearable device can be difficult because a user's finger can be larger than a selection area on the screen causing the user to accidentally select an incorrect icon or other displayed item.

SUMMARY

Exemplary embodiments address at least the above disadvantages and other disadvantages not described above. Also, an exemplary embodiment is not required to overcome the disadvantages described above, and an exemplary embodiment may not overcome any of the problems described above.

The exemplary embodiments relate to a wearable device and method that may automatically detect an image projection area onto which to project an image such as a virtual user interface (UI) screen. For example, the wearable device may configure and provide a UI screen that is appropriate for the detected image projection area.

According to an aspect of an exemplary embodiment, there is provided a wearable device configured to be worn on a body of a user, the wearable device including an image projector configured to project a virtual user interface (UI) screen; a camera configured to capture an image; and a processor configured to detect a target area from the image captured by the camera, control the image projector to project the virtual UI screen, which corresponds to at least one of a shape and a size of the target area, onto the target area, and perform a function corresponding to a user interaction that is input through the virtual UI screen.

The camera may include an omnidirectional lens and may perform omnidirectional photographing through the omnidirectional lens based on an area of the user at which the wearable device is worn.

The wearable device may be a smart watch device and include a display configured to display a UI screen. The processor may detect a body area of the user as the target area from an image captured in any direction based on a wrist area of the user at which the smart watch device is worn and project the virtual UI screen that is formed by reconfiguring a UI screen of the smart watch device to correspond to a shape of the body area of the user, onto the detected body area.

The wearable device may be a head mounted display (HMD) device and may include a display configured to display a UI screen. The processor may detect at least one of a preset space and an object as the target area from an image captured in any direction based on a head area of the user at which the HMD device is worn, and project the virtual UI screen that is formed by reconfiguring the UI screen of the HMD device to correspond to a shape of at least one of the preset space and the object, onto the at least one of the preset space and the object.

The processor may control the image projector to project a virtual UI screen, which is formed by enlarging a UI screen of the wearable device based on at least one of the shape and the size of the target area, onto the target area.

The processor may, in response to a plurality of target areas being detected, determine one of the plurality of target areas onto which the virtual UI screen is to be projected, based on a characteristic of a UI screen displayed by the wearable device.

The processor may, in response to the virtual UI screen being projected onto the target area, control the camera to capture an image of an area at which the virtual UI screen is projected, and display the image.

The processor may, in response to a touch interaction of the user being input with respect to the virtual UI screen, track a motion of a finger of the user, determine a user command input through the UI screen according to the tracked motion of the finger, and perform a function corresponding to the determined user command.

The processor may change at least one of a color and a size of an image of the virtual UI screen according to a user command.

The virtual UI screen may include at least one of a keypad, a touch pad, a list menu, and an input window.

According to an aspect of another exemplary embodiment, there is provided a method of controlling a wearable device, the method including detecting a target area from a captured image; projecting a virtual UI screen, which corresponds to at least one of a shape and a size of the target area, onto the target area; and performing a function corresponding to a user interaction that is input through the virtual UI screen.

The wearable device may include an omnidirectional lens and the detecting may include performing omnidirectional photographing through the omnidirectional lens to capture the image based on an area of a user at which the wearable device is worn.

The wearable device may be a smart watch device and may include a display configured to display a UI screen. The detecting may include detecting a body area of the user as the target area from an image captured in any direction based on a wrist area of the user at which the smart watch device is worn, and projecting the virtual UI screen that is formed by reconfiguring the UI screen displayed by the smart watch device to correspond to a shape of the body area of the user, onto the detected body area.

The wearable device may be a HMD device and may include a display configured to display a UI screen. The detecting may include detecting at least one of a preset space and an object as the target area from an image captured in any direction based on a head area of the user at which the HMD device is worn, and projecting the virtual UI screen that is formed by reconfiguring the UI screen displayed by the HMD device to correspond to a shape of at least one of the preset space and the object, onto the at least one of the preset space and the object.

The virtual UI screen may be formed by enlarging and reconfiguring a UI screen of the wearable device based on at least one of the shape and the size of the target area, and the enlarged UI screen may be projected onto the target area.

The method may further include, in response to a plurality of target areas being detected, determining one of the plurality of target areas onto which the virtual UI screen is to be projected, based on a characteristic of a UI screen displayed by the wearable device.

The method may further include, in response to the virtual UI screen being projected onto the target area, capturing and displaying an image of an area at which the virtual UI screen is projected.

The performing of the function according to the user interaction may include, in response to a touch interaction of the user being input with respect to the virtual UI screen, tracking a motion of a finger of the user, determining a user command input through the virtual UI screen according to the tracked motion of the finger, and performing a function corresponding to the determined user command.

The method may further include changing at least one of a color and a size of an image of the virtual UI screen according to a user command.

The virtual UI screen may include at least one of a keypad, a touch pad, a list menu, and an input window.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
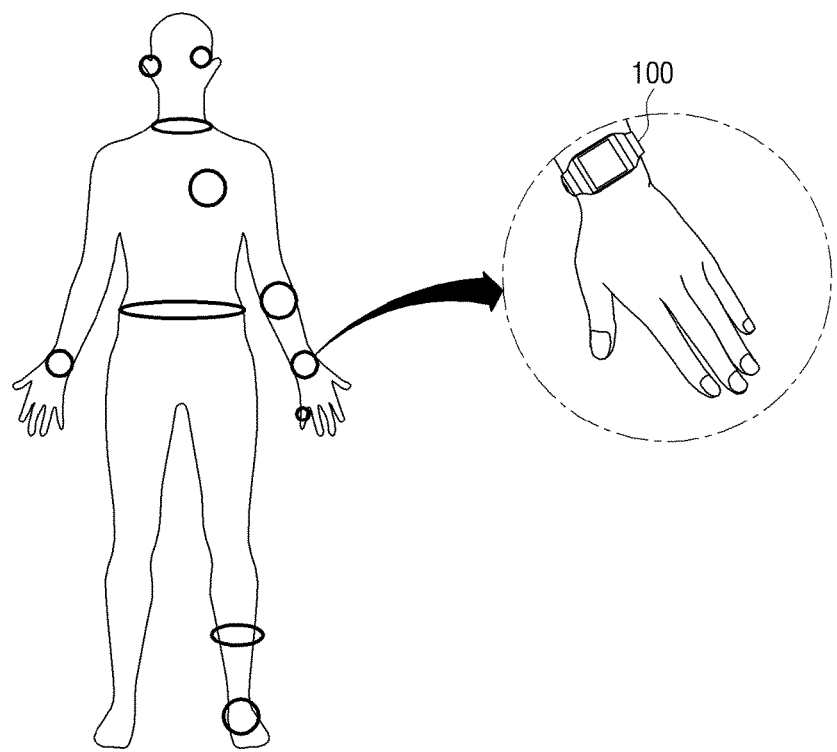
FIG. 1 is a diagram illustrating a wearable device according to an exemplary embodiment.

Exemplary embodiments are described in greater detail herein with reference to the accompanying drawings.

In the following description, the same drawing reference numerals are used for the same elements even in different drawings. The matters defined in the description, such as the detailed construction and elements, are provided to assist a person in a comprehensive understanding of the exemplary embodiments. Thus, it is apparent that the exemplary embodiments may be carried out without those specifically defined matters. Also, well-known functions and/or constructions are not described in detail because they might obscure the exemplary embodiments with unnecessary detail.

FIG. 1 is a diagram illustrating a wearable device according to an exemplary embodiment.

Referring to FIG. 1, a wearable device may be formed of a flexible material (e.g., a silicon rubber) and be capable of being worn by a user. For example, the wearable device may be various types of devices such as a watch, clothes, shoes, gloves, glasses, a hat, accessories (e.g., a ring), a head mounted display, and the like. Examples of a watch that may be put on a wrist of a user and a head mounted display (HMD) that may be worn on a head of a user are further described hereinafter. However, the types of wearable devices are not limited thereto, and thus the wearable device may be any desired wearable device.

A smart watch device 100 refers to an embedded system watch that has more improved functions in comparison to an ordinary clock. For example, a smart watch device 100 may drive mobile applications, some of which may be driven as mobile operating systems (OS). The smart watch device 100 may also have mobile media play functions such as an FM radio function, an audio or video file play function, and the like, which may be listened to with a headset, for example, through a Bluetooth function. As another example, a user may download data according to provided services and set an account of the user through a web browser. The smart watch device 100 may also be used to draw a preset pattern or put a signature in an initial state so as to be unlocked. In other words, the smart watch device 100 may execute and operate most functions that may be performed by an existing smart phone.

The smart watch device 100 may be roughly classified into a stand-alone smart watch and an interlocked smart watch. Both a stand-alone smart watch and an interlocked smart watch may include cameras, accelerometers, thermometers, altimeters, barometers, compasses, chronographs, calculators, portable phones, touch screens, global positioning systems (GPSs), mapping systems, information graphics, computer speakers, calendar functions, watches, secure digital (SD) card capacity device recognition functions, rechargeable batteries, and the like. However, unlike the interlocked smart watch, the stand-alone smart watch may have self-communication functions, such as a wireless headset, a microphone, a call/data modem, a subscriber identification module (SIM) card slot, and the like, so as to be independently used. In contrast, the interlocked smart watch may be linked to a smartphone or other terminal to conveniently synchronize with the smartphone. For example, the interlocked smart watch may be linked to the smartphone through Bluetooth. In the examples herein, a stand-alone smart watch is described but it should be appreciated that it may be modified into a form that may be applied to the interlocked smart watch according to the present general inventive concept.

A HMD refers to an image display apparatus that a user may wear on their head to enjoy or perceive a larger image like with glasses. For example, a HMD may be a next generation image display apparatus that the user carries to enjoy an image on a large screen or that may be applied to a medical device used for surgeries, diagnoses, and the like. The HMD may be used to generate a virtual image that corresponds to a real image.

According to one or more exemplary embodiments, the wearable device 100 may include a camera such as an omnidirectional camera and a projector. As another example, the wearable device 100 may communicate with another terminal such as a smartphone that includes a projector. Wearable devices according to various exemplary embodiments of the present general inventive concept will now be described in detail with reference to the attached drawings.

Figure 2A:
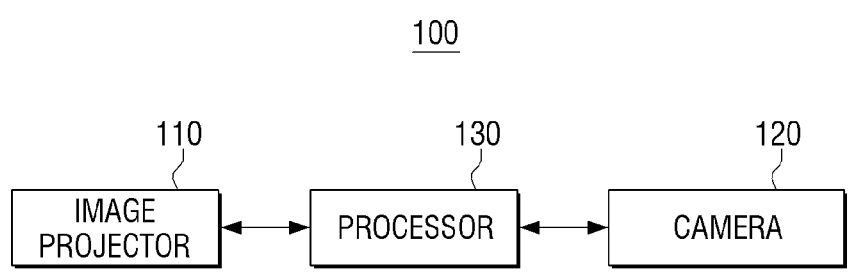
FIGS. 2A and 2B are block diagrams illustrating block diagrams of wearable devices according to various exemplary embodiments.
Figure 2B:
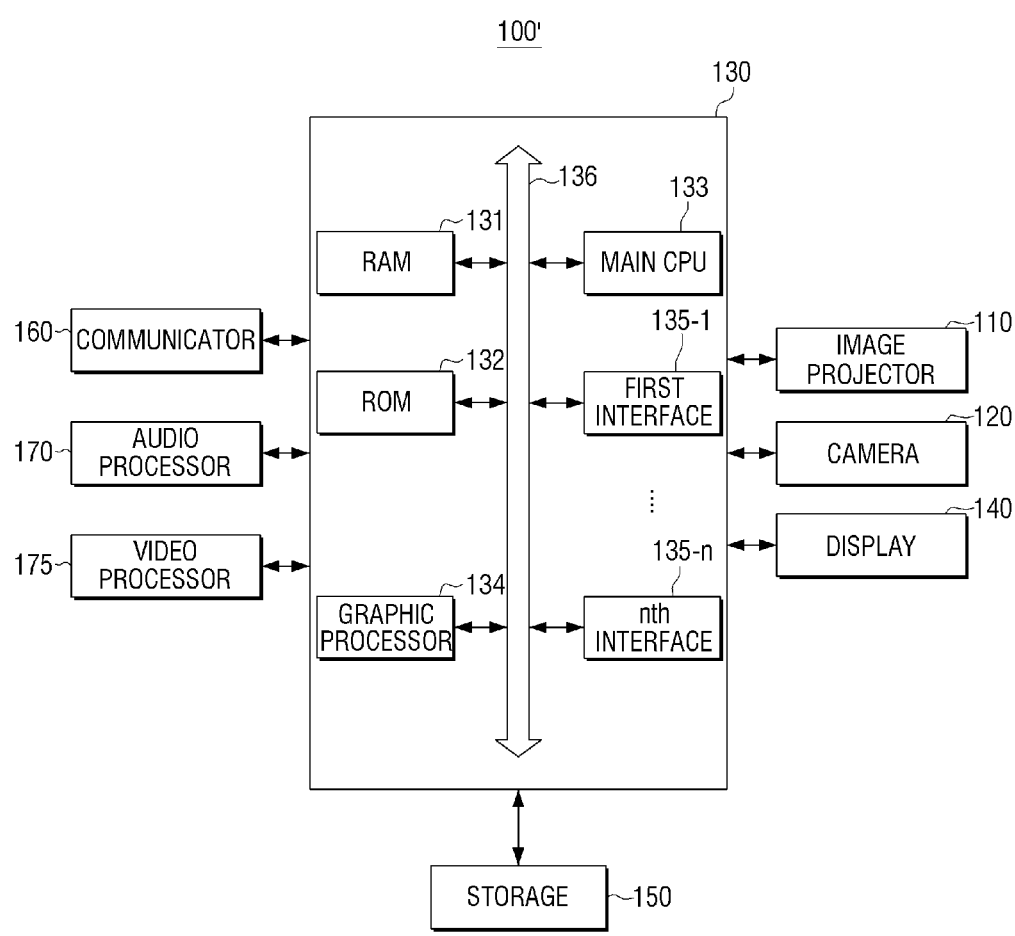

FIGS. 2A and 2B are block diagrams illustrating wearable devices according to various exemplary embodiments.

Referring to FIG. 2A, wearable device 100 includes an image projector 110, a camera 120, and a processor 130. For example, the wearable device 100 may be a device that may be put on a body of a user, or otherwise worn by a user, for example, a smart watch device, a HMD device, and the like, but is not limited thereto.

The image projector 110 projects an image onto or towards a surface of a preset target area. For example, the image projector 110 may include a light source, a transmissive display apparatus, a projection lens, and the like, which may be used to project an image such as a virtual image of a screen towards a target area.

According to one or more exemplary embodiments, the image projector 110 may include at least one small-sized projector that is embedded in the wearable device 100. For example, the small-sized projector may be a light-emitting diode (LED) projector or a laser projector but is not limited thereto. Here, the LED projector may pass light generated from a lamp through a transmissive LED panel to gather or combine images into one and form an image in a projection area through a projection lens. As another example, the laser projector may form an image in a projection area through a laser.

The camera 120 may perform photographing based on a position of the user at which the wearable device 100 is worn. For example, the camera 120 may include an omnidirectional lens and may perform omnidirectional photographing through the omnidirectional lens based on a wearing area in which the wearable device 100 is worn. Here, the omnidirectional lens may be a super-wide-angle lens that may perform photographing in all directions (i.e. in 360°). As another example, the omnidirectional lens may be a super-wide-angle lens that has a view angle, for example, between 180° and 360°. As an example, a captured result may appear as a circle of view of 360° as if an object is captured through the eyes of a fish. Accordingly, a lens referred to as a fisheye lens (or a whole sky lens) may be used. As another example, an image that is acquired through the omnidirectional lens may be a cylindrical image, and the camera 120 may convert the cylindrical image into a two-dimensional (2D) plane square-shaped image through an existing image conversion method.

The processor 130 detects a target area from an image captured by the camera 120 and projects a virtual user interface (UI) screen towards a target area. In this example, the virtual UI may be configured in a shape to correspond to a shape of the detected target area. The processor 130 may also perform a function according corresponding to a user interaction that is input through the virtual UI screen. For example, the user may touch or otherwise move their hand or finger in a direction of the virtual UI and such a touch or movement may be detected and processed by the processor 130.

As a non-limiting example, if the wearable device 100 is a smart watch device, the processor 130 may detect at least one of a hand area and an arm area of the user through an omnidirectional photographing based a wrist area of the user on which the smart watch device is worn.

For example, the processor 130 may detect an area of skin from the captured image using color of the skin. In other words, the processor 130 may determine whether pixels of an image are pixels corresponding to skin and output a skin image indicating whether each respective pixel of an image is a skin pixel. For example, the processor 130 may use a Gaussian mixture model for all of the pixels of an input image to check a pre-generated skin probability table value to determine whether a pixel from among the pixels of an image is a skin pixel. It should also be appreciated that a skin detection method is not limited thereto, and various types of technologies and/or methods may be applied to detect an area of skin of a user. Also, in some examples, after a skin color is detected, the processor 130 may detect a hand area based on hand characteristic information. For example, the processor 130 may divide a hand shape from a captured image through a hand shape divider.

In an example in which the wearable device 100 is a HMD device, the processor 130 may detect at least one of a preset space and an object as the target area from an image captured that is captured in all directions based on a head area on which the HMD device is worn. In this example, the processor 130 may detect a target area based on predefined area information, for example, information about various types of objects such as a front door, furniture, a TV, etc., but is not limited thereto.

The processor 130 may reconfigure a displayed virtual UI screen based on at least one of a shape and a size of the detected target area and project the reconfigured virtual UI screen onto the detected target area. For example, if the user moves causing a change in the shape and/or size of the target area, the processor 130 may reconfigure the virtual UI screen to correspond to the change in shape and/or size of the target area.

As another example, the processor 130 may also enlarge the displayed virtual UI screen based on at least one of the shape and the size of the detected target area and project the enlarged virtual UI screen onto a detected body area. Also, if the virtual UI screen is projected onto the detected target area, the processor 130 may be used to capture and display an image of the target area onto which the virtual UI screen is projected. In this example, the processor 130 may scale and display the captured image according to a screen size of a display unit.

According to an aspect of an exemplary embodiment, the processor 130 may detect a user interaction with respect to a projected image. For example, the processor 130 may calculate tracking information about a motion of a finger of the user, such as motion of a fingertip, from an image captured through the camera 120. In this example, the processor 130 may detect a hand of the user from a user captured image and track a position of the finger of the user using an image analysis program. For example, the processor 130 may track a motion of the finger of the user based on positions of the finger of the user that are detected from previous and current frames in order to calculate the tracking information, determine a user command corresponding to the tracking information, and perform a function corresponding to the determined user command. In this example, the omnidirectional lens described herein may be used to generate a captured image for detecting the motion of the finger of the user. It should also be appreciated that an additional or different imaging lens may be used.

The processor 130 may provide visual feedback onto a virtual UI screen according to a user touch interaction with respect to the virtual UI screen. For example, the processor 130 may change a color of or highlight a virtual UI element touched by the user to be distinguishable on the virtual UI screen from a color or display of another virtual UI element.

The processor 130 may determine an area onto which an image such as a virtual UI is to be projected, based on a characteristic of a target area among at least one target areas. For example, if the size of an image to be projected is relatively small, the processor 130 may determine that the back of a user's hand is an adequate area as a projection area. As another example, if the size of the image to be projected is relatively large, the processor 130 may determine that the back of a user's arm is an adequate area as a projection area.

The processor 130 may recognize a predefined space or an object in a captured image and determine an area corresponding to the recognized predefined space or object as a target area onto which an image is to be projected. For example, the processor 130 may determine an area of space corresponding to a predefined object, such as furniture, a household appliance, and the like, as a target area.

The processor 130 may be used to adjust the color, light, shade, projection direction, and the like of the projected image according to a user command. For example, the processor 130 may automatically determine the back of a user's hand as a projection area and project an image, but may change the projection area from the back of the user's hand to the back of the user's arm according to a user command.

According to one or more exemplary embodiments, the processor 130 may automatically project a displayed UI screen onto a body area of a user. However, as another example, in response to a preset event, the processor 130 may perform an image projection function according to the present general inventive concept. For example, if there is a shaking event, a button pressing event, or the like, the processor 130 may perform a corresponding image projection function.

FIG. 2B is a block diagram illustrating a wearable device 100', according to another exemplary embodiment.

Referring to FIG. 2B, wearable device 100' includes the image projector 110, the camera 120, and the processor 130. In this example, the wearable device 100' also includes a display 140, a storage 150, a communicator 160, an audio processor 170, and a video processor 175.

The display 140 displays a screen. For example, the screen may include various types of contents, such as an image, a moving picture, a text, music, etc., a graphic user interface (GUI) including various types of contents, an application execution screen, and the like. For example, the display 140 may display a UI screen including at least one selected from a keypad, a touch pad, a list menu, and an input window.

The display 140 may be or may include a liquid crystal display (LCD) panel, an organic light-emitting diode (OLED), and the like, but is not limited thereto. Also, the display 140 may be or may include a touch screen forming an interactive layer structure with a touch pad. In this case, the display 140 may be used as a UI in addition to being used as an output unit. Here, the touch screen may be configured to detect a touch input position, a touch input area, and a touch input pressure.

The storage 150 may store various types of programs or data that are related to an operation of the wearable device 100'. For example, the storage 150 may store setup information that is set by a user, an operating system (O/S) software, various types of applications, and the like. Also, the processor 130 may control an overall operation of the wearable device 100' using various types of programs that are stored in the storage 150.

As shown in the example of FIG. 2B, the processor 130 includes a random access memory (RAM) 131, a read only memory (ROM) 132, a main central processing unit (CPU) 133, a graphic processor 134, first through nth interfaces 135-1 through 135-*n*, and a bus 136. For example, the RAM 131, the ROM 132, the main CPU 133, the graphic processor 134, and the first through nth interfaces 135-1 through 135-*n* may be connected to one another through the bus 136.

The ROM 132 may store a command set for system booting, and the like. If a turn-on command is input to supply power, the main CPU 133 may copy an O/S stored in the storage 150 into the RAM 131, according to a command stored in the ROM 132, and execute the O/S to boot the system. If booting of the system is complete, the main CPU 133 may copy various types of programs stored in the storage 150 into the RAM 131 and execute the programs that are copied into the RAM 131 to perform various types of operations. For example, the main CPU 133 may copy an image program (or software) stored in the storage 150 into the RAM 131 and execute the image program copied into the RAM 131 to track a user finger motion.

The graphic processor 134 may generate a screen including various types of objects, such as icons, images, texts, etc., using a calculator (not shown) and a renderer (not shown). The calculator may calculate coordinate values at which objects are to be displayed, and attribute values of the objects such as shapes, sizes, colors, and the like, according to a layout of the screen using a control command. The renderer may generate a screen having various types of layouts including an object based on the attribute values calculated by the calculator. The screen generated by the renderer may be displayed in a display area of the display 140.

The main CPU 133 may access the storage 150 to perform booting using the O/S stored in the storage 150. For example, the main CPU 133 may perform various types of operations using various types of programs, contents, data, and the like, stored in the storage 150.

The first through the nth interfaces 135-1 through 135-*n* may be connected to various types of elements described above. For example, one or more of the first through nth interfaces 135-1 through 135-*n* may be a network interface that is connected to an external device through a network.

The communicator 160 may communicate with various types of external devices. For example, the communicator 160 may perform communications according to various types of communication methods such as a WiFi communication method, a Bluetooth communication method, a near field communication (NFC) method, an infrared communication method, and the like. In an example in which the wearable device 100' is an interlocked smart watch, the communicator 160 may communicate with an external user terminal device such as a smartphone.

The audio processor 170 is used to process audio data. For example, the audio processor 170 may perform various types of processing, such as decoding, amplifying, noise filtering, and the like, on the audio data.

The video processor 175 is used to signal-process image data. For example, the video processor 175 may perform various types of image processing, such as decoding, scaling, noise filtering, frame rate conversion, resolution conversion, and the like, on the image data.

Although not shown in FIG. 2B, the wearable device 100' may further include a scaler, a display driver, and a keystone corrector. The scaler may convert an input image signal into a size corresponding to a display size and a display resolution. The display driver may convert the image signal converted by the scaler into various types of formats according to types of display panel, and the keystone corrector may correct a keystone of a projection image. For example, the keystone corrector may correct positions of sides of the projection image to correct the keystone, according to a user control signal. Here, the keystone correction may include corrections such as zoom in/out, rotation, movement, and the like.

Figure 3:
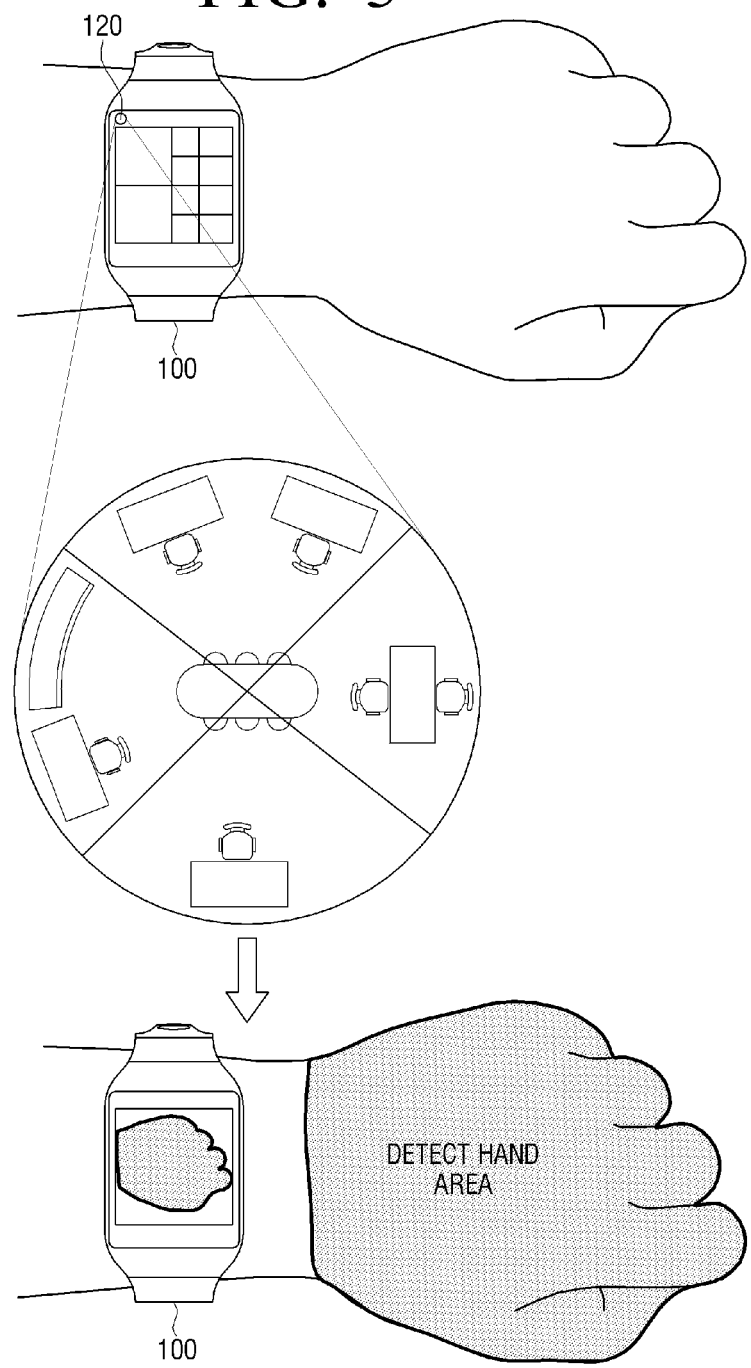
FIG. 3 is a diagram illustrating an example of detecting a target area according to an exemplary embodiment.

FIG. 3 is a diagram illustrating an example of detecting a target area according to an exemplary embodiment.

Referring to FIG. 3, the camera 120 may perform omnidirectional photographing and may be provided in a bezel area of a wearable device 100 which in this example is a smart watch. Here, a hand area of the user may be detected as a target area by the camera 120 based on an area at which the smart watch is worn by the user.

Figure 4A:
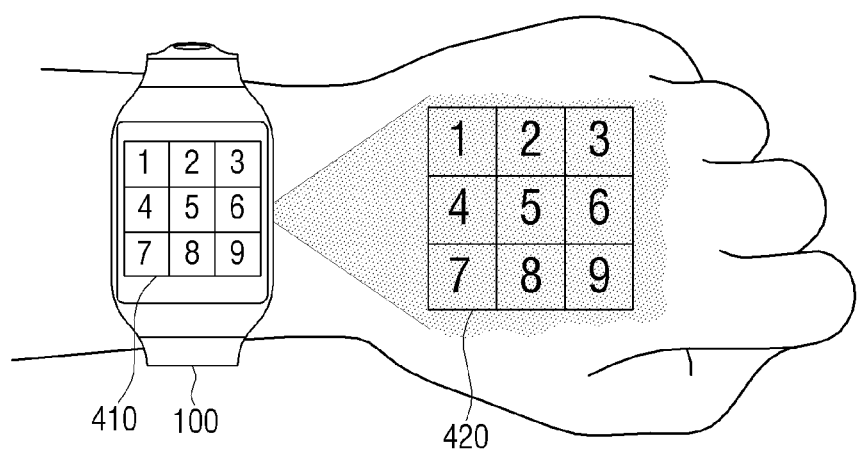
FIGS. 4A through 4C are diagrams illustrating examples of providing a virtual user interface (UI) screen according to various exemplary embodiments.
Figure 4B:
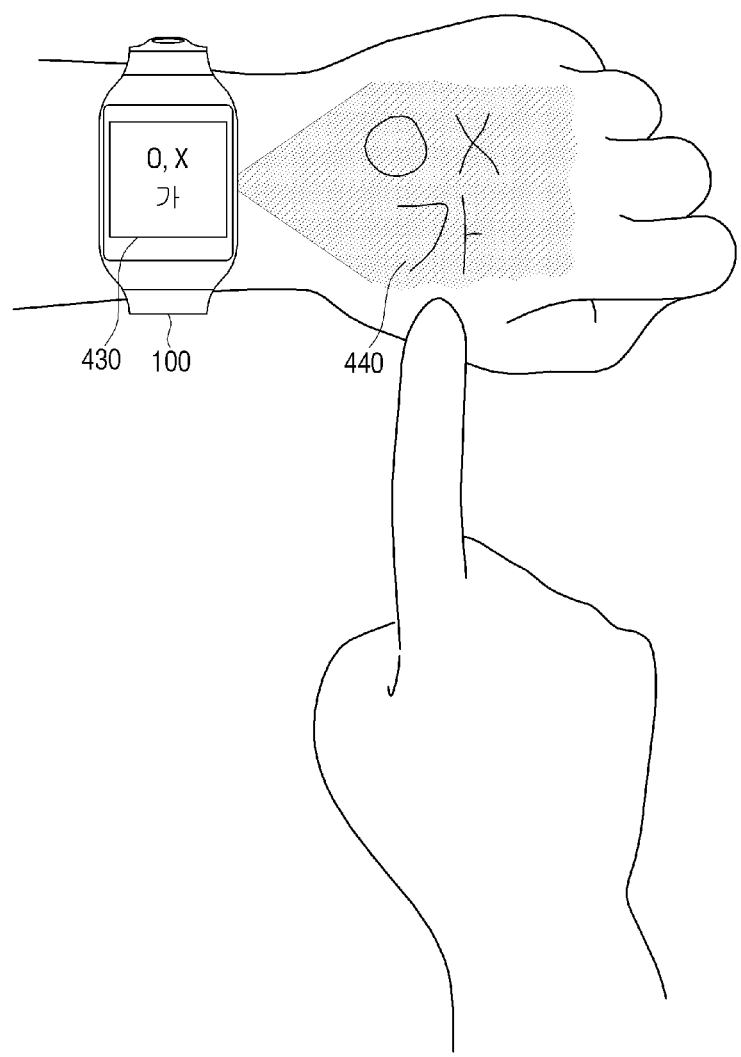
Figure 4C:
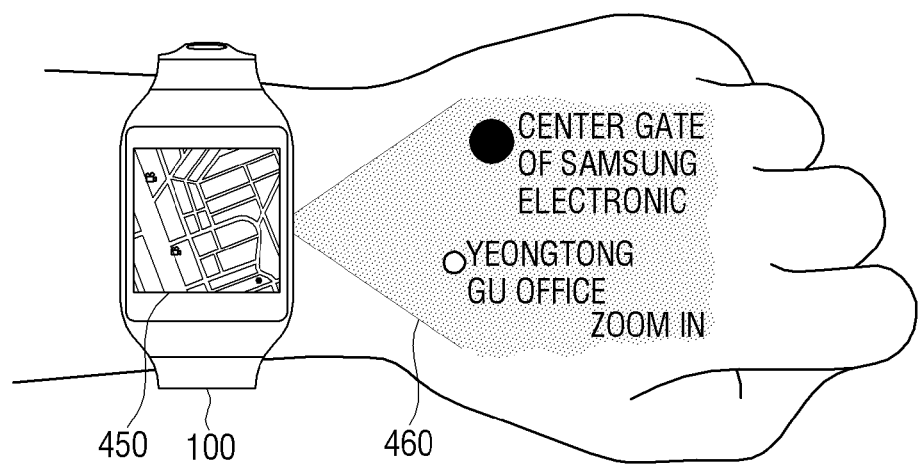

FIGS. 4A through 4C are diagrams illustrating examples of providing a virtual UI screen according to various exemplary embodiments.

Referring to FIG. 4A, wearable device 100 is a smart watch. In this example, a hand area of a user may be detected through an omnidirectional photographing based on a wrist area at which the smart watch is worn. Accordingly, a displayed UI screen 410 may be enlarged based on at least one of a shape and a size of the detected hand area, and an enlarged virtual UI screen 420 may be projected onto the hand area of the user.

Referring to FIG. 4B, a virtual interfacing area 440 may be provided onto the detected hand area of a user according to an image projection method to enable the user to recognize a writing input. For example, the virtual interfacing area 440 may operate as a virtual touch pad that may receive a virtual input corresponding to a UI screen 430 displayed in the wearable device 100. In this example, a user can touch one of the characters displayed on the virtual interfacing area 440 provided on the hand of the user, and the wearable device 100 may detect the touch as if the user was touching the UI screen 430. Accordingly, the wearable device can enlarge the UI screen 430 and provide the enlarged screen as a virtual UI screen in the virtual interfacing area 440.

As another example, referring to FIG. 4C, the wearable device 100 may provide a map screen 450. In this example, the wearable device 100 may also provide a virtual interfacing area 460 that operates as a touch pad capable of controlling the map screen 450. For example, the virtual interfacing area 460 may be provided onto the detected hand area of the user according to an image projection method to enable the user to recognize a user input.

Figure 5A:
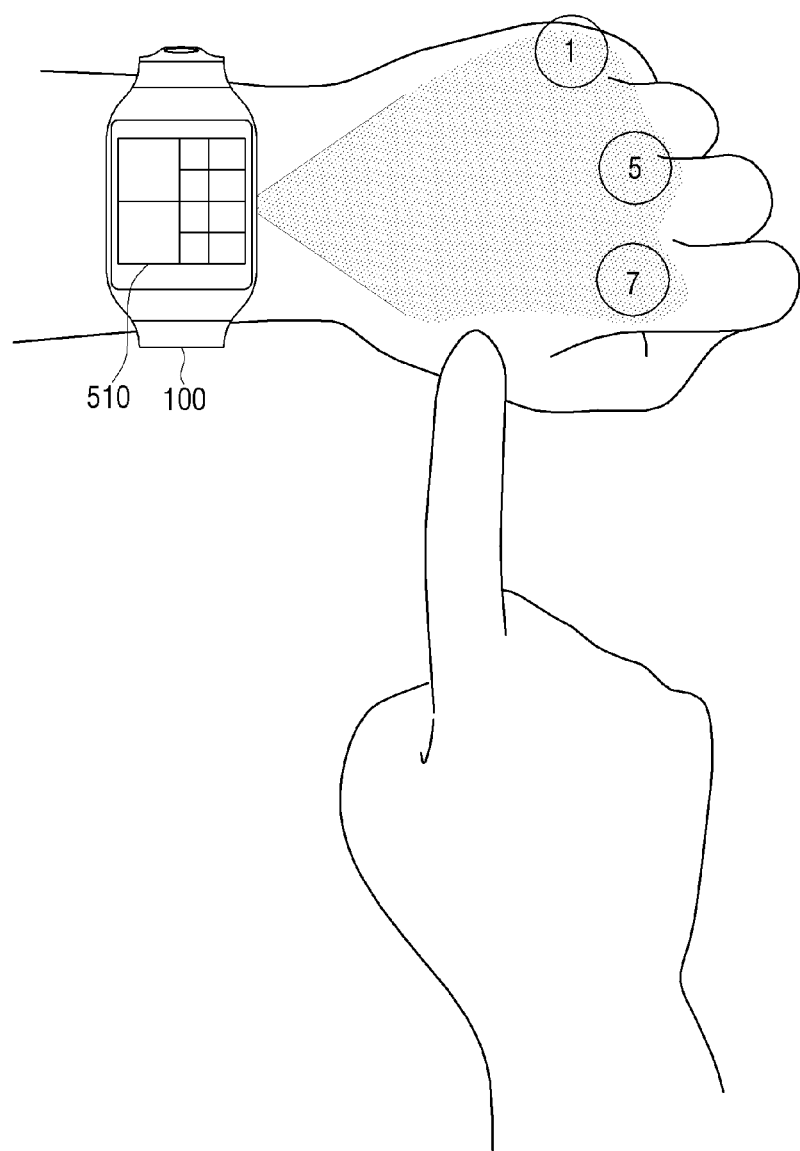
FIGS. 5A and 5B are diagrams illustrating examples of providing a virtual UI screen according to other exemplary embodiments.
Figure 5B:
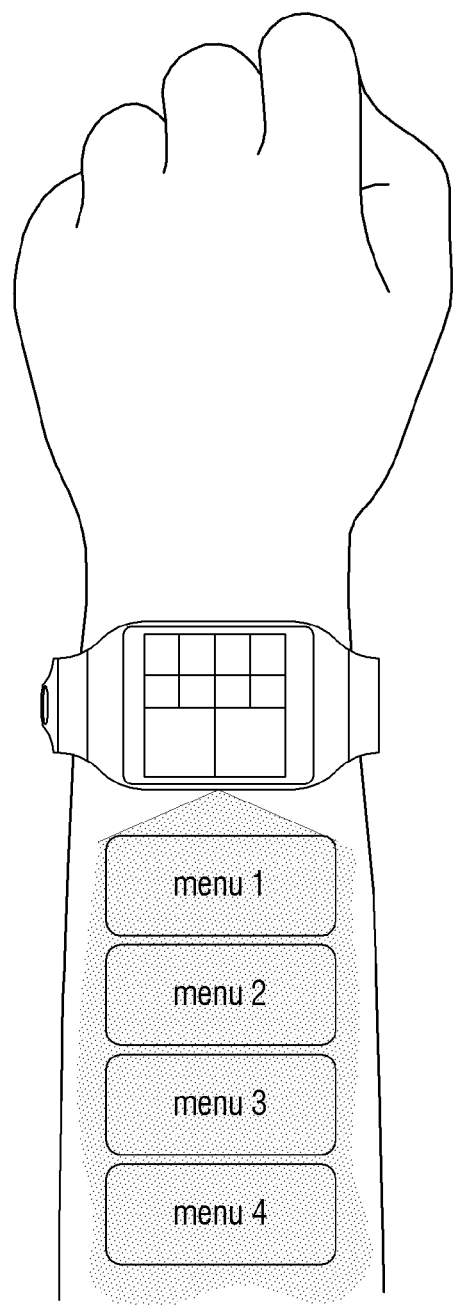

FIGS. 5A and 5B are diagrams illustrating examples of providing a virtual UI screen according to other exemplary embodiments.

Referring to FIG. 5A, a partial area of a body area that is detected by the wearable device 100 may be determined as appropriate for a characteristic of a UI screen, and an image may be projected using the corresponding partial body area.

For example, a back area of a hand and a joint area of the hand may both be detected, and a UI element provided on a UI screen may be determined as a UI appropriate for providing divided areas into the joint area of the hand. Accordingly, a virtual UI screen that is formed by reconfiguring the UI screen to a size and shape that is appropriate for the joint area may be projected onto the joint area.

Referring to FIG. 5B, if a plurality of body areas are detected by the wearable device 100, one of the plurality of body areas onto which an image corresponding to a UI screen is to be projected may be determined and provided based on a characteristic of the UI screen. In the example shown in FIG. 5B, a hand area and a back of an arm area of a user are each detected as potential areas for projecting a virtual UI screen. Accordingly, the UI screen may be provided to the back of the arm area in a shape and size that corresponds to a shape and a size of the back of the arm. For example, the virtual UI screen may be provided in a longer form than if provided on the back of the hand. Also, a virtual UI screen that is formed by reconfiguring the UI screen to be of a size and/or a shape that is appropriate for the selected projection area may be projected onto the back area of the arm.

Figure 6A:
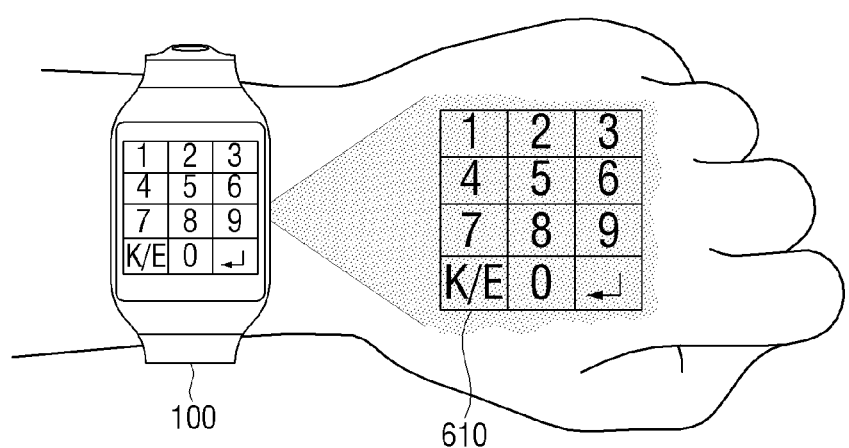
FIGS. 6A and 6B are diagrams illustrating examples of providing a virtual UI screen according to other exemplary embodiments.
Figure 6B:
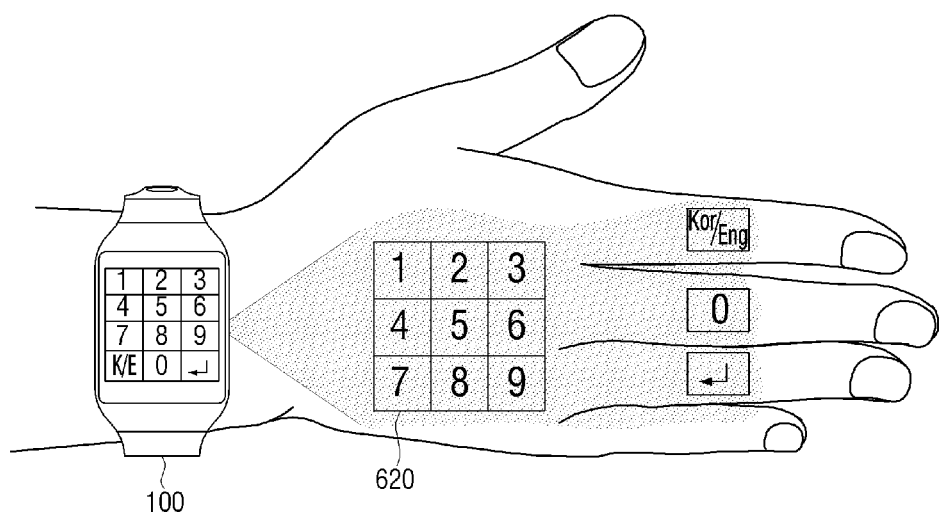

FIGS. 6A and 6B are diagrams illustrating examples of providing a virtual UI screen according to other exemplary embodiments.

Referring to FIG. 6A, a UI element is provided as one UI element on a projection area 610. As another example, as shown in FIG. 6B, the same UI element may be divided into a plurality of UI elements, for example, based on a shape of a detected body area or a size of the UI element and provided onto a projection area 620.

Figure 7:
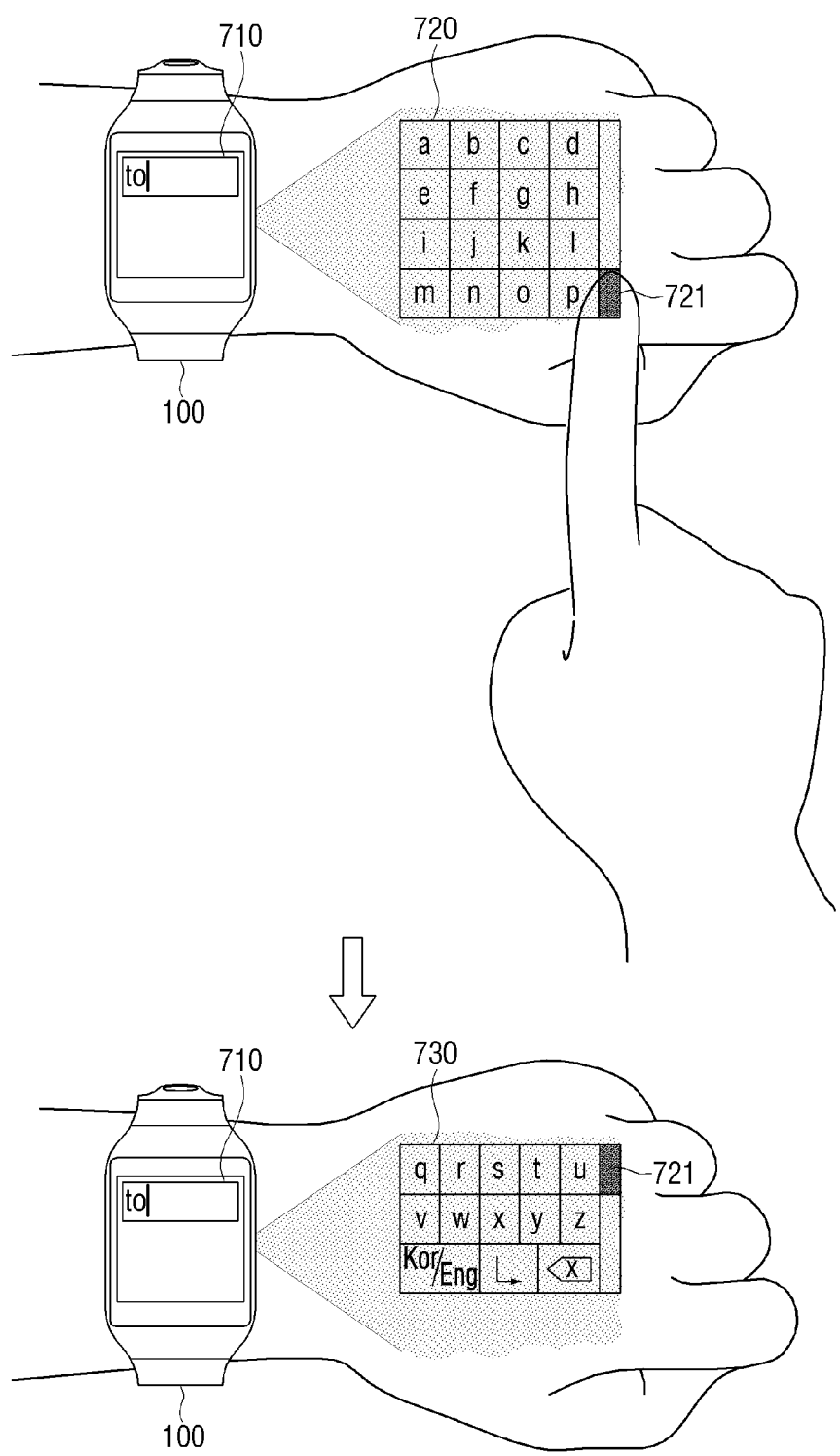
FIG. 7 is a diagram illustrating an example of providing a virtual UI screen according to another exemplary embodiment.

FIG. 7 is a diagram illustrating an example of providing a virtual UI screen according to another exemplary embodiment.

Referring to FIG. 7, it may be difficult to provide an entire UI screen onto a detected projection area at a single time. Accordingly, only a partial UI screen 720 may be projected and provided at one time, and another UI screen 730 may be projected and provided according to a user interaction. In this example, the user interaction may be a user interaction for controlling a scroll bar 721 up and down but is not limited thereto. As another example, a manipulation of a button provided on the wearable device 100 or the like may be the user interaction.

Also, in the example shown in FIG. 7, a UI screen that interacts with a projected virtual UI screen 730 such as an input window 710 is simultaneously provided on a screen of the wearable device 100.

Figure 8:
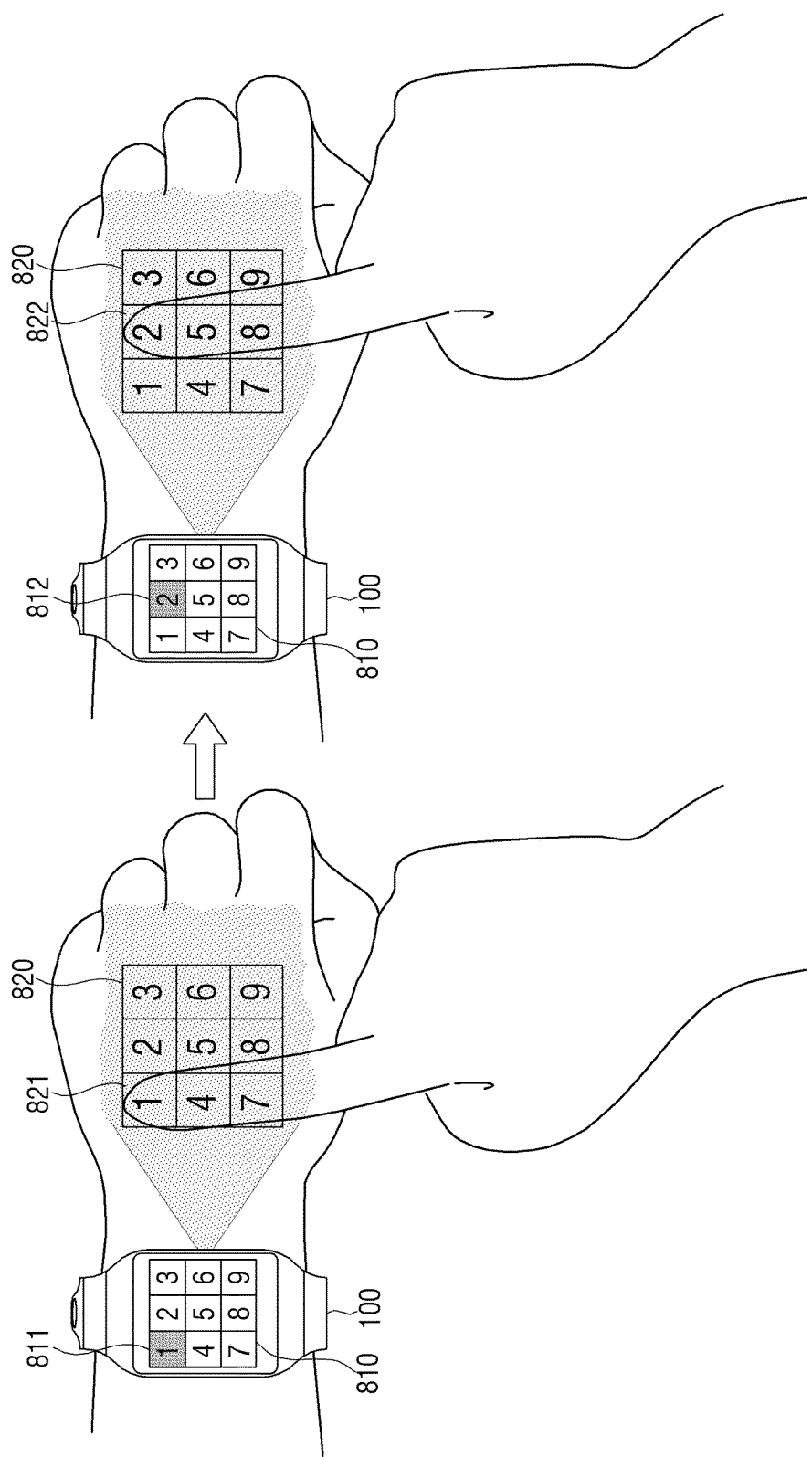
FIG. 8 is a diagram illustrating an example of providing a virtual UI screen according to another exemplary embodiment.

FIG. 8 is a diagram illustrating an example of providing a virtual UI screen according to another exemplary embodiment.

Referring to FIG. 8, a touch interaction of a user may be input through a corresponding virtual UI screen 820 projected onto a body area of a user. Accordingly, the wearable device 100 may detect a motion of a finger of a user, determine a command input through the virtual UI screen 820 according to the detected motion of the finger, and perform a function corresponding to the determined user command.

In the example shown in FIG. 8, a user interaction of pressing a particular key 821 and 822 is input through a virtual keypad screen 820 that is projected onto the back of a hand of the user. In response, actual keys 811 and 812 corresponding to keys 821 and 822 may be pressed on an actual keypad screen 810 displayed by the wearable device 100. In other words, the wearable device 100 may detect the motion of the finger of the user with respect to the virtual UI screen 820 projected on the back of the user's hand to determine a user manipulation performed on a displayed UI keypad screen 810 of the wearable device 100. Here, the keypad screen may be a keyboard screen of 3×3, 3×4, 4×3, or 4×4 but is not limited thereto.

Figure 9A:
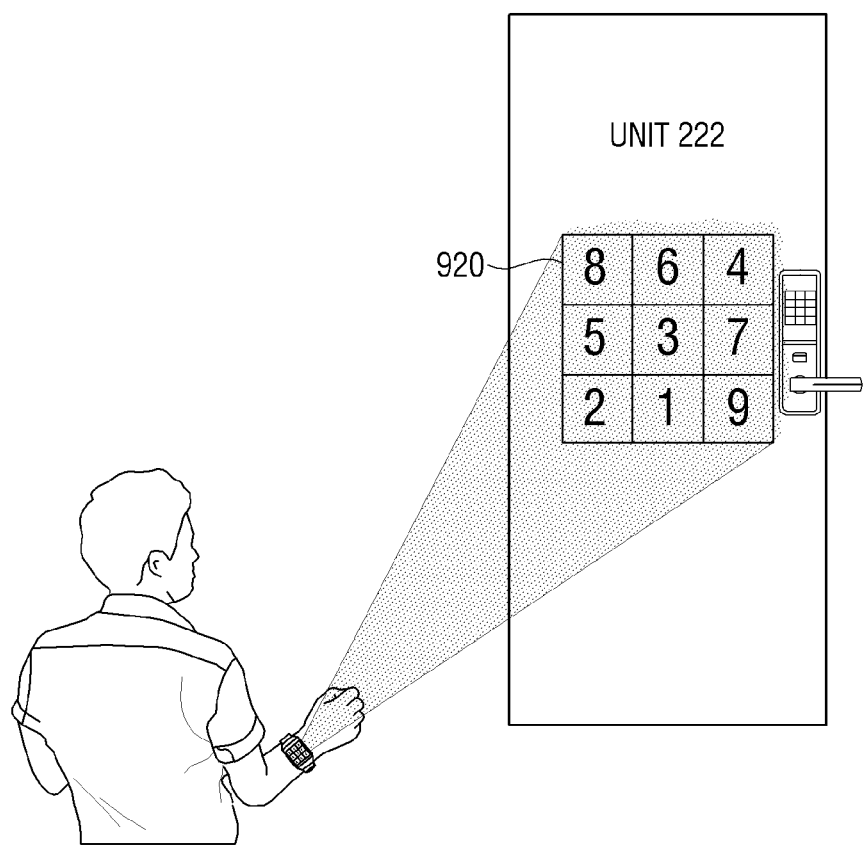
FIGS. 9A and 9B are diagrams illustrating examples of providing a virtual UI screen according to other exemplary embodiments.
Figure 9B:
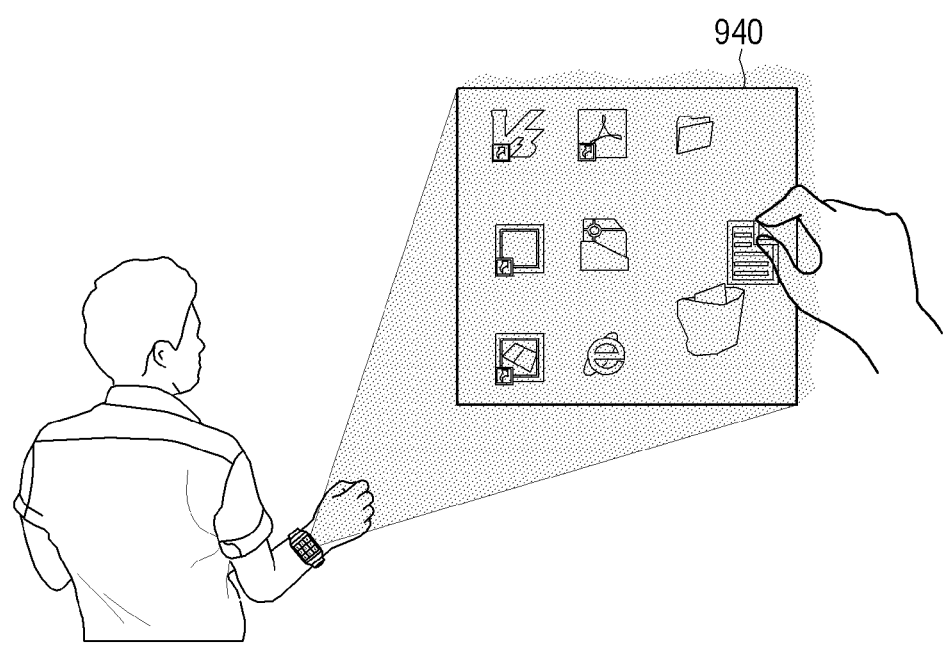

FIGS. 9A and 9B are diagrams illustrating examples of providing a virtual UI screen according to other exemplary embodiments.

Referring to FIG. 9A, if a predefined particular place or space is recognized from a captured image, the wearable device 100 may provide a UI screen corresponding to the predefined particular place or space. In this example, a pre-registered front door is recognized from a captured image as shown in FIG. 9A, and the wearable device 100 projects a virtual UI screen 920. Here, the virtual UI screen 920 includes a keypad for releasing a door lock, that is, for unlocking the door. In this example, the wearable device 100 may track a user interaction that is input by the user through the virtual UI screen 920 and perform a function for releasing the door lock based on the input on the virtual UI screen 920.

Referring to FIG. 9B, the wearable device 100 may provide various types of UIs, and reconfigure and provide a virtual UI screen, in real time, according to a user interaction. For example, the wearable device 100 may provide a virtual UI screen 940 including items that are provided on an initial screen of a smartphone. If an arrangement of the items on the screen is changed according to a user interaction, the wearable device 100 may provide the changed arrangement state of the items on the virtual UI screen, in real time. For example, if an item is added, deleted, moved, or otherwise changed on a screen of the wearable device, the change may simultaneously be reflected on the virtual UI screen 940 that is projected from the wearable device.

As another example, while the virtual UI screen 940 is displayed on a surface of an object, a wall, or the like, a user may select an item from or otherwise manipulate the virtual UI screen 940 using their hand. For example, the user can pass their hand through the projection emitted from the wearable device and the wearable device can detect a user selection based on a location of the user's hand with respect to the virtual UI screen 940 projected from the wearable device. For example, a user's hand may be detected as passing through a right side of the projected virtual UI screen 940 at a location between the wearable device and a surface displaying the virtual UI screen 940. Accordingly, a user may pass their hand through the projection and perform various actions to manipulate the virtual UI screen 940 corresponding to the screen of the wearable device.

Figure 10A:
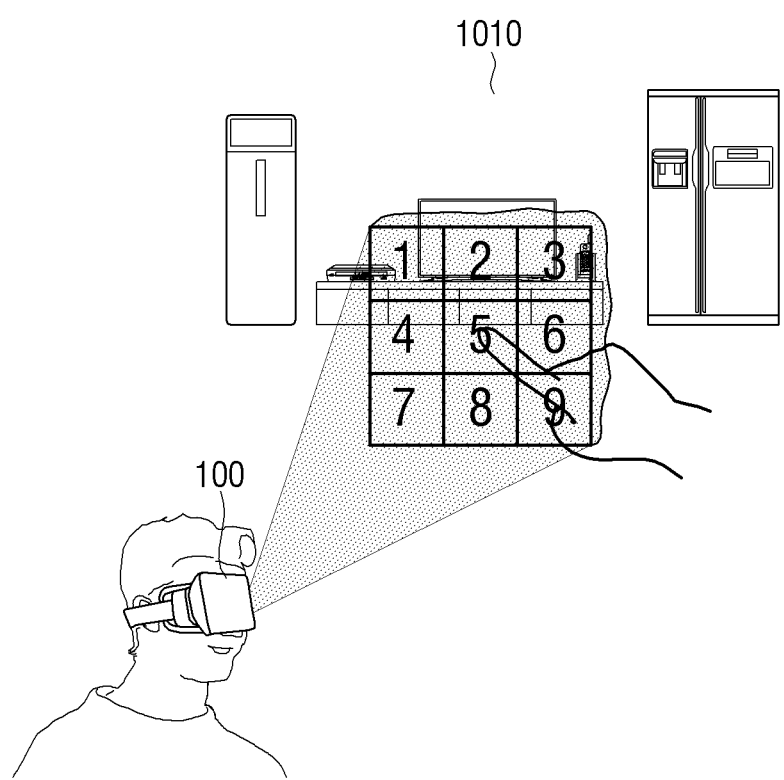
FIGS. 10A and 10B are diagrams illustrating examples of providing a virtual UI screen according to other exemplary embodiments.
Figure 10B:
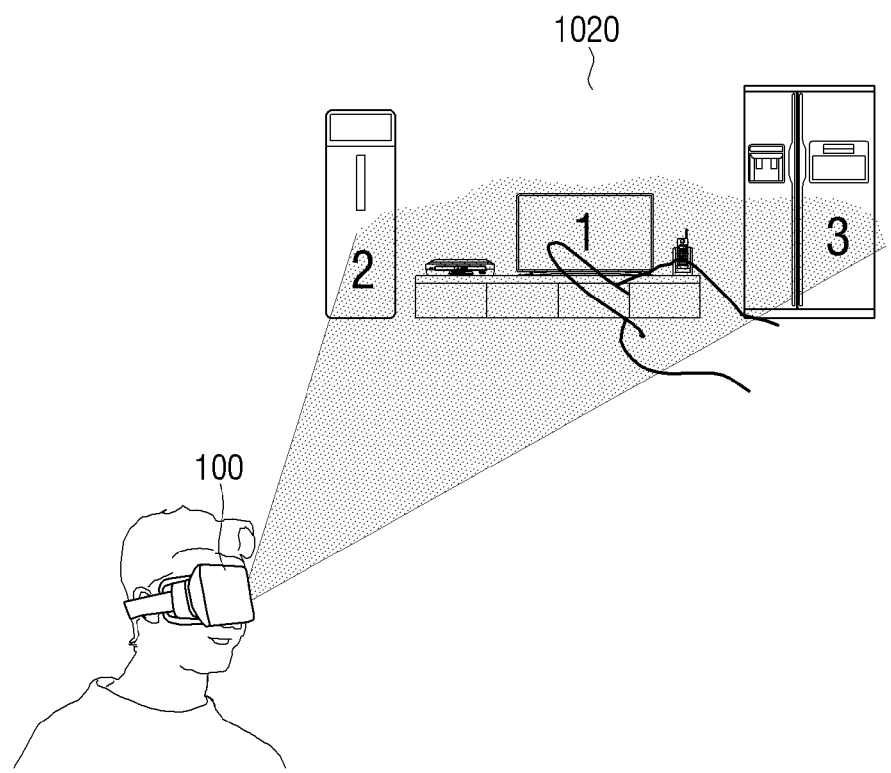

FIGS. 10A and 10B are diagrams illustrating examples of providing a virtual UI screen according to other exemplary embodiments.

Referring to FIG. 10A, the wearable device 100 may project a virtual UI screen 1010 on a space recognized from a captured image. However, as shown in FIG. 10B, if a predefined object is recognized, the wearable device 100 may provide a virtual UI screen 1020 on a space corresponding to a shape and/or size of the predefined particular object. For example, the wearable device 100 may distinguishably provide a virtual UI element (e.g., a key including a keypad) on a space corresponding to a frame, a chair, a wall, and the like, that may be distinguishably recognized by the user. Accordingly, the user may select a virtual UI element by moving their finger or hand over an area corresponding to the virtual UI element on the virtual UI screen 1020. For example, the finger of the user may be located at a position between the wearable device 100 and a space on which the virtual UI screen 1010 or 1020 is located. Here, the wearable device 100 can detect the input of a user while the user passes their finger through the projected image of the virtual UI screen 1010 or 1020.

Figure 11:
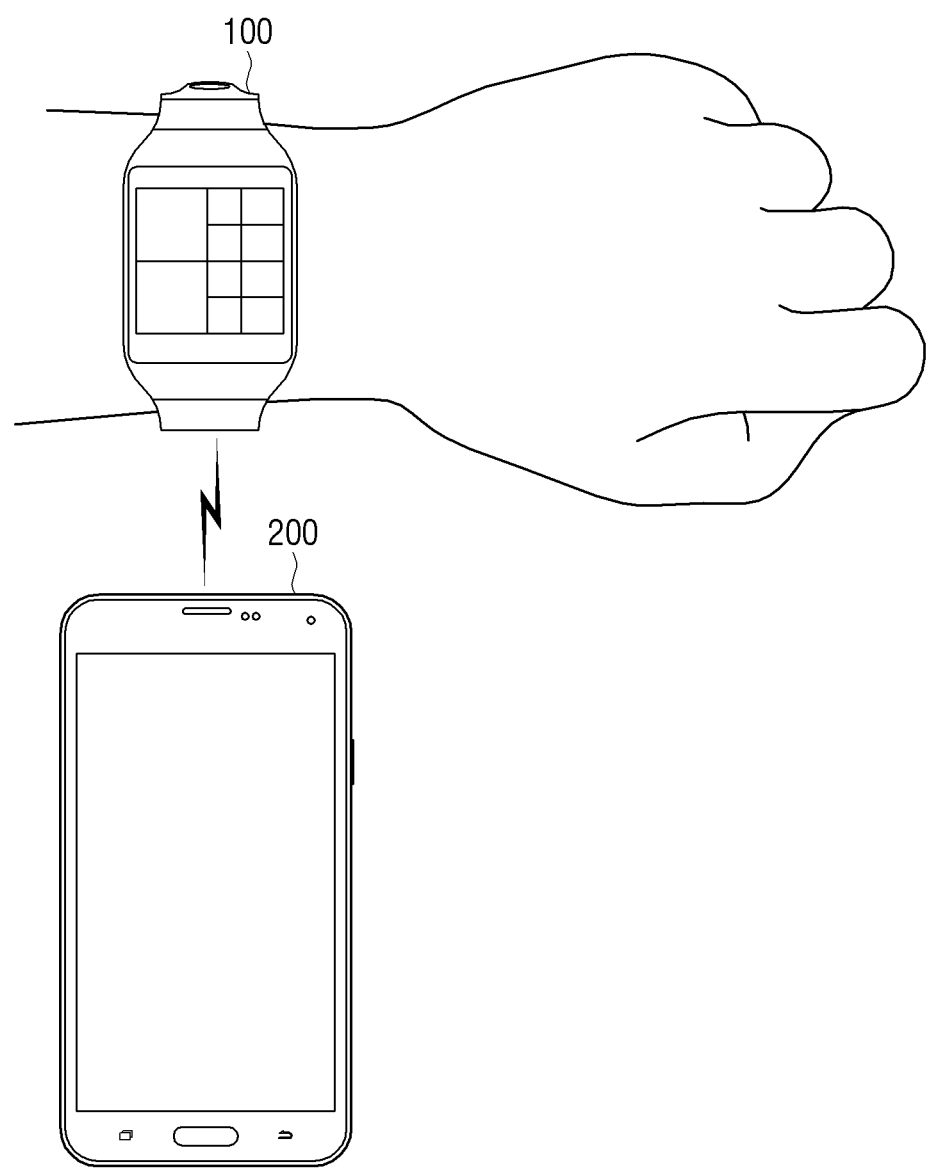
FIG. 11 is a diagram illustrating an example of a wearable device according to another exemplary embodiment.

FIG. 11 is a diagram illustrating a wearable device 100 according to another exemplary embodiment.

Referring to FIG. 11, the wearable device 100 may operate in connection with an external user terminal device 200 such as a smartphone or other device or apparatus. For example, the wearable device 100 may use, manipulate, or otherwise control a camera or a projector included in the external user terminal device 200. Accordingly, the wearable device 100 can control a projector of the user terminal device 200 to project a virtual UI screen thereby increasing a user convenience.

Figure 12:
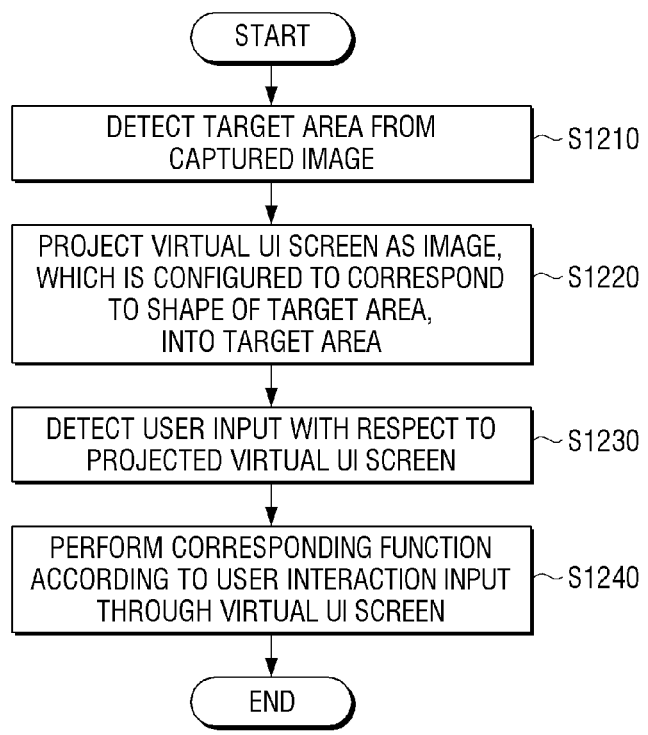
FIG. 12 is a flowchart illustrating a method of controlling a wearable device according to an exemplary embodiment.

FIG. 12 is a flowchart illustrating a method of controlling a wearable device according to an exemplary embodiment.

Referring to FIG. 12, in operation S1210, a target area is detected from an image captured by a camera included in the wearable device.

In operation S1220, a virtual UI screen is configured in a size and shape to correspond to a size and shape of the detected target area is the virtual UI screen is projected onto the target area.

In operation S1230, a user input is detected with respect to the projected virtual UI screen. For example, the virtual UI screen may be displayed on a body part of a user of the wearable device. Accordingly, an input of the user may be performed by the user moving their finger or hand over an area corresponding to a button or other item of the projected virtual UI screen. For example, referring to FIG. 4A, a user may move their finger over one of the buttons or elements corresponding to numbers 1 through 9. Accordingly, the wearable device may detect or otherwise track a motion of a user's finger as an input of selecting a number between 1 and 9 based on a detection or tracking of the user's finger with respect to the projected virtual UI screen.

In operation S1240, a function that corresponds to the user input detected through the virtual UI screen is performed.

According to various exemplary embodiments, the wearable device may include an omnidirectional lens and may perform omnidirectional photographing through the omnidirectional lens based on an area of a user on which the wearable device is worn.

For example, the wearable device may be a smart watch device or apparatus that displays a UI screen, detect a body area of a user wearing the wearable device as a target area from an image captured in any direction based on a wrist area on which the smart watch device is worn, and project a virtual UI screen, which is formed by reconfiguring a UI screen of the smart watch to correspond to a shape of the detected body area of the user, onto the detected body area.

As another example, the wearable device may be a HMD device or apparatus. The HMD may detect at least one of a preset space and an object as a target area from an image captured in any direction from the HMD based on a head area on which the HMD device is worn. Accordingly, the HMD may project a virtual UI screen, which is formed by reconfiguring a UI screen to correspond to a shape of at least one of the preset space and the object, onto at least one of the preset space and the object. As an example, the wearable device may project a virtual UI screen onto a preset space or an object that is located within a predetermined distance from the wearable device.

Referring again to FIG. 12, in operation S1220 in which the virtual UI screen is projected onto the target area, the virtual UI screen may be formed by enlarging and reconfiguring a UI screen based on at least one of a shape and a size of the target area and may be projected onto the target area.

In some examples, the method of controlling the wearable device may further include, in response to a plurality of target areas being detected, determining one of the plurality of target areas onto which a virtual UI screen is to be projected, based on a characteristic of the UI screen. Also, the method may further include, in response to the virtual UI screen being projected onto the target area, capturing and displaying an image of the projected virtual UI screen.

In operation S1240 where the function corresponding to the user interaction is performed, in response to a touch interaction of the user being input with respect to the virtual UI screen, a motion of a finger may be tracked. Accordingly, a user command input through the UI screen may be determined according to the tracked motion of the finger, and a function corresponding to the determined user command may be performed.

In some examples, the method may further include changing and providing at least one of a color and a size of a projected image including a virtual UI screen according to a user command. For example, the virtual UI screen may include at least one of a keypad, a touch pad, a list menu, and an input window.

According to various exemplary embodiments, a peripheral area of a wearable device may be detected and may be used as a user interfacing area. Accordingly, an input area of the wearable device may be enlarged and provided.

For example, a user may attach or otherwise wear a wearable device or wearable apparatus described according to the exemplary embodiments. The wearable device may discover an area to be used for projecting a virtual user interface screen. For example, an area located on the user in a periphery of the wearable device may be detected. As a non-limiting example, the wearable device may be worn on the wrist of a user, and the area in the periphery of the wearable device may be on the back of the user's hand or the back of the user's arm. As another example, the wearable device may discover an area or object located around the user such as a door, a wall, a piece of furniture, an appliance, and the like, which may be used to receive a projection of a virtual user interface from the wearable device.

A control method according to the above-described various exemplary embodiments may be included as a program and provided to a wearable device.

For example, there may be provided a non-transitory computer readable medium that stores a program that may perform detecting a target area from a captured image; projecting a virtual UI screen, which is configured to correspond to a shape of the target area, onto the target area; and performing a corresponding function according to a user interaction input through the virtual UI screen. In addition, there may be provided a non-transitory computer readable medium that stores a program for performing the control method according to the above-described various exemplary embodiments.

The non-transitory computer readable medium refers to a medium which does not temporarily store data for a short period of time such as a register, a cache memory, a memory, or the like, but a medium that permanently or semi-permanently stores data and is readable by a device. For example, the above-described applications or programs may be stored and provided on a non-transitory computer readable medium such as a CD, a DVD, a hard disk, a blue-ray disk, a universal serial bus (USB), a memory card, a ROM, or the like. Also, programs as described above may be stored and provided on the storage 150 of the display apparatus 100 as an example of the non-transitory computer readable medium.

The foregoing exemplary embodiments and advantages are merely for purposes of example and are not meant to be construed as limiting in any way. It will be appreciated that the present teaching can be readily applied to other types of apparatuses. Also, the description of the exemplary embodiments is intended to be illustrative, and not to limit the scope of the claims, and alternatives, modifications, and variations will be apparent to those skilled in the art.

What is claimed is:

1. A wearable device configured to be worn on a body of a user, the wearable device comprising:
   a display;
   an image projector;
   a camera; and
   a processor configured to:
      control the display to display a UI screen,
      obtain a body area of the user as a target area from an image captured by the camera,
      control the image projector to project a virtual user interface (UI) screen onto the target area, and
      perform a function corresponding to a user interaction that is input through the virtual UI screen,
      wherein the processor obtains a first virtual UI screen to project a first reconfigured layout of the UI screen based on at least one of a first shape and a first size of the body area, and obtains a second virtual UI screen to project a second reconfigured layout of the UI screen based on at least one of a second shape and a second size of the body area,
      wherein the processor simultaneously displays the UI screen on the display while the virtual UI screen is projected on to the target area, and
      wherein the first virtual UI screen displays different content than as compared to the UI screen.

2. The wearable device of claim 1, wherein the camera comprises an omnidirectional lens and is configured to perform omnidirectional photographing through the omnidirectional lens based on an area of the body of the user at which the wearable device is worn.

3. The wearable device of claim 2, wherein the wearable device is a smart watch device, and
   wherein the processor is configured to detect the body area of the user from the image captured in any direction based on a wrist area of the user at which the smart watch device is worn.

4. The wearable device of claim 2, wherein the wearable device is a head mounted display (HMD) device.

5. The wearable device of claim 1, wherein the processor is configured to control the image projector to project the virtual UI screen, which is formed by enlarging the UI screen of the wearable device based on at least one of a shape and a size of the body area, onto the target area.

6. The wearable device of claim 1, wherein the processor is configured to, in response to a plurality of target areas being detected, determine one of the plurality of target areas onto which the virtual UI screen is to be projected, based on a characteristic of the UI screen displayed by the wearable device.

7. The wearable device of claim 1, wherein the processor is configured to, in response to the virtual UI screen being projected onto the target area, control the camera to capture an image of an area at which the virtual UI screen is projected, and display the image of the area at which the virtual UI screen is projected.

8. The wearable device of claim 1, wherein the processor is configured to, in response to a touch interaction of the user being input with respect to the virtual UI screen, track a motion of a finger of the user, determine a user command input through the virtual UI screen according to the motion of the finger that is tracked, and perform a function corresponding to the user command.

9. The wearable device of claim 1, wherein the processor is configured to change at least one of a color and a size of an image of the virtual UI screen according to a user command.

10. The wearable device of claim 1, wherein the virtual UI screen comprises at least one of a keypad, a touch pad, a list menu, and an input window.

11. A method of controlling a wearable device, the method comprising:
displaying a UI screen;
obtaining a body area of a user as a target area from a captured image;
projecting a virtual user interface (UI) screen, onto the target area; and
performing a function corresponding to a user interaction that is input through the virtual UI screen,
wherein the projecting the virtual UI screen comprises obtaining a first virtual UI screen to project a first reconfigured layout of the UI screen based on at least one of a first shape and a first size of the body area, and obtaining a second virtual UI screen to project a second reconfigured layout of the UI screen based on at least one of a second shape and a second size of the body area,
wherein the displaying the UI screen comprises simultaneously displaying the UI screen on a display while the virtual UI screen is projected on to the target area, and
wherein the first virtual UI screen displays different content than as compared to the UI screen.

12. The method of claim 11, wherein the wearable device comprises an omnidirectional lens, and the obtaining comprises performing omnidirectional photographing through the omnidirectional lens to capture the captured image based on an area of a body of the user at which the wearable device is worn.

13. The method of claim 12, wherein the wearable device is a smart watch device, and
wherein the obtaining comprises obtaining the body area of the user from the captured image in any direction based on a wrist area of the user at which the smart watch device is worn.

14. The method of claim 12, wherein the wearable device is a head mounted display (HMD) device.

15. The method of claim 11, wherein the virtual UI screen is formed by enlarging and reconfiguring the UI screen of the wearable device based on at least one of a shape and a size of the body area, and the UI screen that is enlarged and reconfigured, is projected onto the target area.

16. An apparatus configured to be worn on a body of a user, the apparatus comprising:
a display;
a projector; and
a processor configured to:
control the display to display a UI screen,
obtain a body area of the user as a target area based on an area of the body at which the user is wearing the apparatus,
control the projector to project a virtual user interface (UI) towards the target area, and
detect a user input with respect to the virtual UI,
wherein the processor obtains a first virtual UI screen to project a first reconfigured layout of the UI screen based on at least one of a first shape and a first size of the body area, and obtains a second virtual UI screen to project a second reconfigured layout of the UI screen based on at least one of a second shape and a second size of the body area,
wherein the processor simultaneously displays the UI screen on the display while the virtual UI is projected on to the target area, and
wherein the first virtual UI screen displays different content than as compared to the UI screen.

17. The apparatus of claim 16, wherein the virtual UI is larger in size than the display of the apparatus.

18. The apparatus of claim 17, wherein the processor is configured to simultaneously display a UI screen on the display of the apparatus which interacts with the virtual UI.

19. The apparatus of claim 17, wherein the apparatus comprises a watch that is configured to be worn on a wrist of the user, and the virtual UI is projected onto at least one of an arm or a hand of the user.

20. The apparatus of claim 19, wherein the projector is further configured to project the virtual UI towards a preset space or an object located within a predetermined distance from the user, and the processor is configured to detect a user input with respect to the virtual UI that is projected toward the preset space or the object.

21. The wearable device of claim 1, wherein the processor is further configured to generate the virtual UI screen to display an enlarged copy of a first content displayed on the UI screen based on at least one of a shape and a size of the body area.

22. The wearable device of claim 1, wherein the processor is further configured to:
detect a back of a hand of the user as a first potential target area and a back of an arm of the user as a second potential target area;
determine the first potential target area or the second potential target area as the target area based on a characteristic of the UI screen displayed by the wearable device; and
control the image projector to project the virtual UI screen onto the target area based on determining the first potential target area or the second potential target area as the target area.

23. The wearable device of claim 1, wherein the processor is further configured to:
control the image projector to project a partial UI screen onto the target area;
detect a user interaction based on controlling the image projector to project the partial UI screen; and control the image projector to project another partial UI screen onto the target area based on detecting the user interaction.

* * * * *